Aug. 23, 1966  J. M. COLVIN  3,267,488
LENS HOLDER

Filed July 22, 1964  2 Sheets-Sheet 1

Jack M. Colvin
INVENTOR.

BY Clarence A. O'Brien
and Harvey B. Jacobson
Attorneys

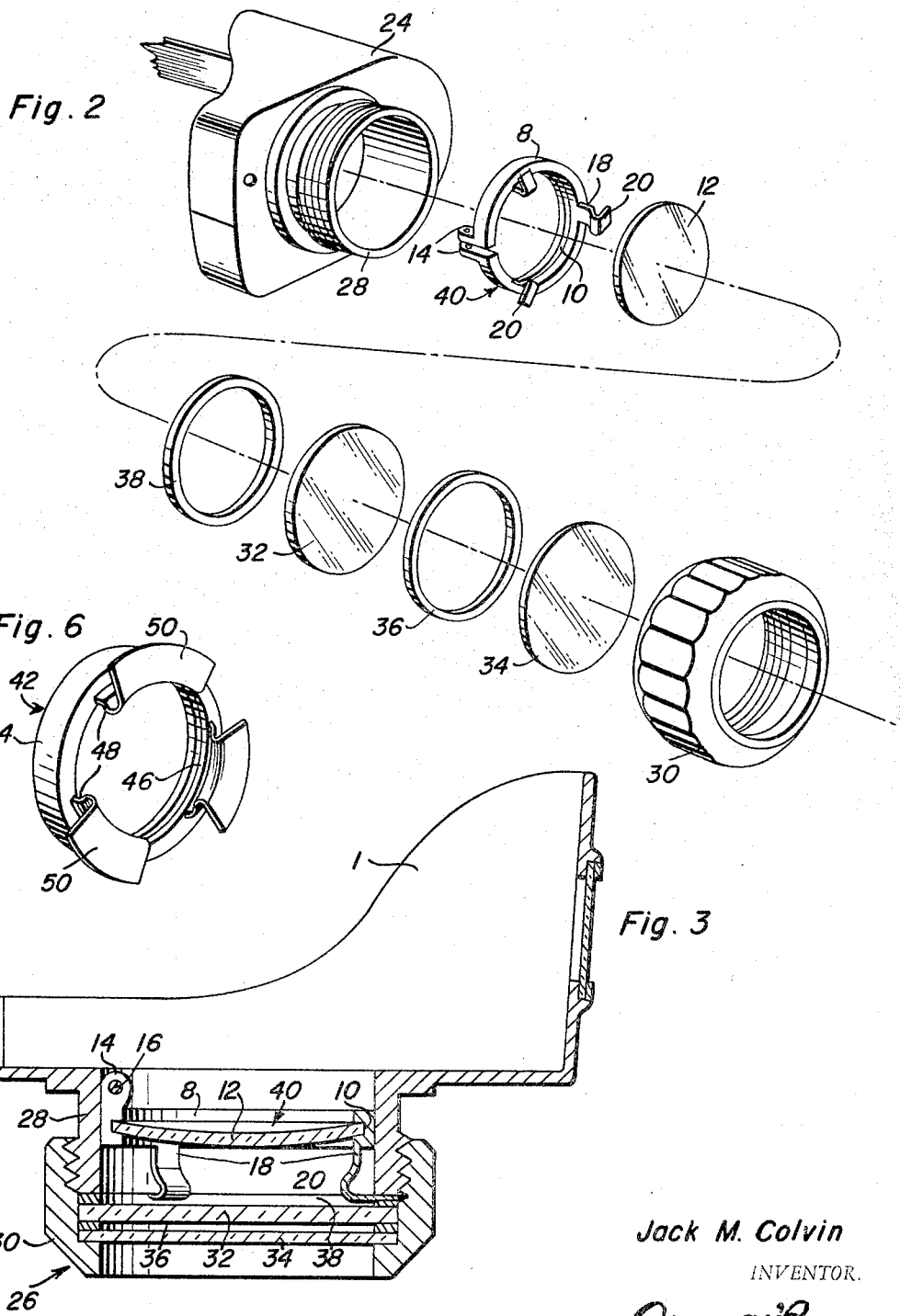

United States Patent Office 3,267,488
Patented August 23, 1966

3,267,488
LENS HOLDER
Jack M. Colvin, Box 227, Sulphur, La.
Filed July 22, 1964, Ser. No. 384,293
5 Claims. (Cl. 2—14)

This invention generally relates to goggles and has for its primary object to provide, in a manner as hereinafter set forth, unique means whereby magnifying or corrective lenses may be expeditiously incorporated in welding and other types of protective goggles, whereby the necessity of wearing both goggles and eyeglasses is obviated.

Another highly important object of the present invention is to provide a magnifying or corrective lens holder of the character described which may be readily inserted in conventional goggles without the necessity of altering same.

Still another important object of the present invention is to provide a lens holder of the character set forth which permits interchangeability of the lenses and which, further, supports the lenses in the goggles at the correct distance from the eyes.

Other objects are to provide a lens holder of the aforementioned character which is relatively simple in construction, strong, durable, compact, of light weight and which may be manufactured at low cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 2 is a perspective view of one of the goggles, showing the parts separated;

FIGURE 3 is a view in horizontal section on an enlarged scale, taken substantially on the line 3—3 of FIGURE 1;

FIGURE 6 is a perspective view of a modified holder.

Figure 1:
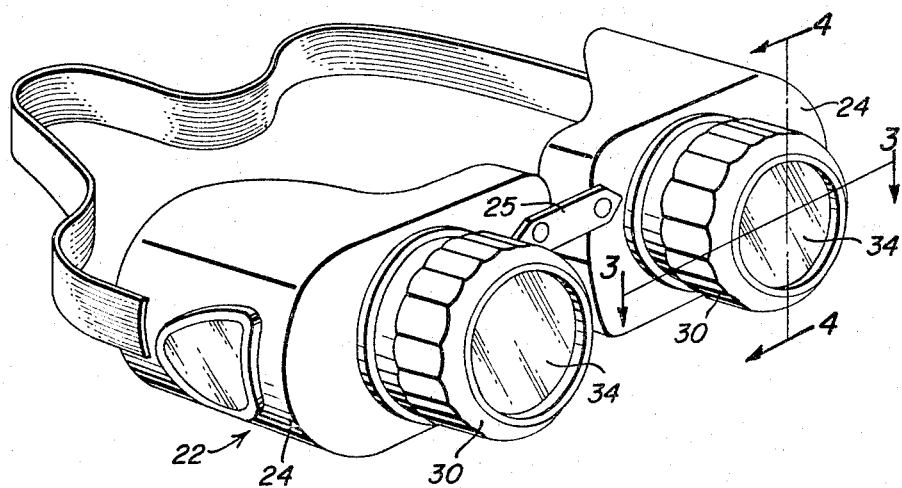
FIGURE 1 is a perspective view of a pair of goggles having incorporated therein holders and lenses in accordance with the present invention.
Figure 5:
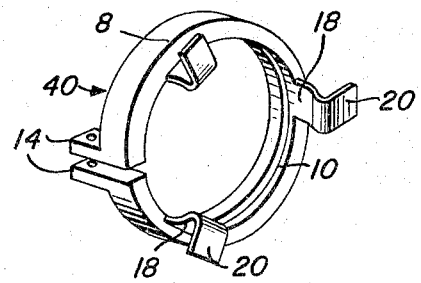
FIGURE 5 is a perspective view of the lens holder per se.

Referring now to the drawing in detail, it will be seen that the embodiment of the present invention which has been illustrated in FIGURE 5 of said drawing comprises a split, cylindrical ring 8 of suitable resilient metal. The ring 8 is formed to provide an internal circumferential groove or channel 10 for the reception of the peripheral portion of a magnifying or corrective lens 12.

The opposed ends of the split ring 8 have formed integrally therewith opposed, lateral ears or the like 14. The ears 14 threadedly receive a screw 16 through the medium of which the ring 8 is contracted for clamping same on the lens 12.

It will be observed that the ears 14 project from the inner side of the ring 8. Formed integrally with the outer side of the ring 8, at circumferentially spaced points, are outwardly extending arms or legs 18. The legs 18 terminate in inwardly and then outwardly bent free end portions providing feet or the like 20 the purpose of which will be presently set forth.

Figure 4:
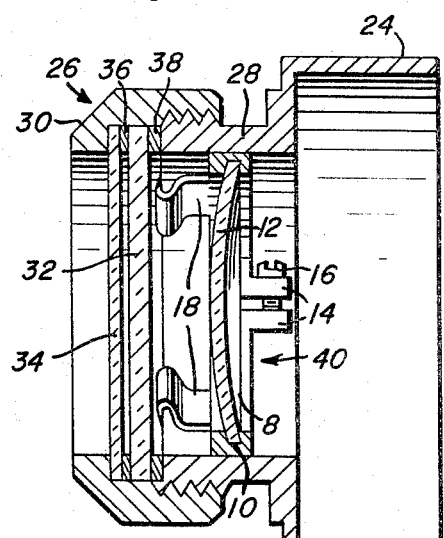
FIGURE 4 is a vertical sectional view on an enlarged scale, taken substantially on the line 4—4 of FIGURE 1.

Reference numeral 22 generally designates a conventional pair of goggles in which a pair of the holders embodying the present invention may be mounted. Each of the goggles of the pair of goggles 22 includes an eye cup 24 of plastic or other suitable material pivotally connected at 25. Extending forwardly from each goggle 24 is a lens cell assembly 26. The assembly 26 comprises an externally threaded neck or the like 28 on the eye cup or body 24. A removable cap or the like 30 is screwed on the neck 28 and has mounted therein tinted and clear inner and outer protective lenses 32 and 34, respectively. A gasket or washer 36 is provided between the lenses 32 and 34. A similar gasket or washer 38 is provided between the lens 32 and the free end of the neck 28. This is shown to advantage in FIGURE 4 of the drawing.

In use, the ring 8 is expanded to permit insertion of the lens 12 in the groove or channel 10 in said ring. Through the medium of the screw 16, the ring 8 is then contracted on the lens. The lens cell 26 is then disassembled to permit insertion of the ring 8 in the neck 28, the feet 20 engaging the free or outer end of said neck. The lens cell 26 is then reassembled and the holder is firmly secured in position in an obvious manner. In this connection it will be observed that the feet 20 are clamped between the outer end of the neck 28 and the washer or gasket 38. The lens holder of the present invention is designated generally by reference numeral 40.

In the embodiment of FIGURE 6 of the drawing, reference numeral 42 generally designates a lens holder of a suitable plastic. The holder 42 includes a cylindrical solid ring 44 having an internal circumferential groove 46 therein for the reception of the magnifying or corrective lens. Then, formed integrally with the inner side or end of the cylindrical ring 42 is a plurality of relatively wide, rearwardly extending arms or legs 48 which terminate in inwardly and then outwardly radiating segmental feet or flanges 50 which function in the manner of the elements 20.

To insert a magnifying or corrective lens in the holder 42, the plastic ring 44 is expanded by heating said ring. After the lens has been thus inserted the ring 44 is shrunk thereon by permitting said ring to cool. In both holders of the present invention the rings may be suitably marked to facilitate correct positioning of the lenses therein.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. For mounting in a goggle of the type including a lens cell comprising a neck and a removable cap on the neck, a lens holder, said holder comprising a ring for the reception of a lens, said ring including inner and outer sides and an outer peripheral edge, said ring being selectively expansible and contractible, said ring in its contracted position presenting a substantially continuous outer peripheral edge free of lateral projections so as to adapt said holder to an unmodified lens cell, and a plurality of mounting legs fixed to the outer side of said ring at peripherally spaced points thereabout, said legs projecting laterally of said outer side generally inward of the outer peripheral edge.

2. The lens holder of claim 1 wherein said ring is split so as to define two ring ends, said ring being resilient for selective movement of the ring ends toward and away from each other, thereby defining the expansible and contractible nature of the ring, a pair of ears, one ear being fixed to the inner side of the ring adjacent each ring end, said ears projecting laterally from said inner side substantially completely inward of said outer peripheral edge so as to maintain the peripheral edge free of lateral projections, and means engaged between said ears for selectively drawing said ears, and thereby the ring ends, toward each other for fixing a lens therein.

3. The lens holder of claim 2 wherein at least three equally spaced mounting legs are provided so as to produce a balanced three-point support for said holder.

4. In combination, a goggle and a lens holder, said goggle comprising a lens cell including a neck, said neck having an open completely planar lens receiving end, a cap removably mounted on said neck over said end, said holder comprising a ring of substantially the same diameter as the interior of said neck received within said neck, said ring having an outer face directed toward said neck end, an inner face opposite said outer face, and an outer peripheral edge, said peripheral edge being substantially continuous and free of lateral projections, a plurality of mounting legs fixed to the outer face of said ring and projecting laterally therefrom toward said end of the neck, said legs being positioned generally inward of said outer peripheral edge so as to maintain the projection free nature of said edge, a laterally projecting flat foot on the outer end of each leg, said feet overlying the planar end of said neck, said cap clamping said feet against said end, said ring being selectively expansible and contractible.

5. The combination of claim 4 wherein said ring is split so as to define two ring ends, said ring being resilient for selective movement of the ring ends toward and away from each other, thereby defining the expansible and contractible nature of the ring, a pair of ears, one ear being fixed to the inner face of the ring adjacent each ring end, said ears projecting laterally from said inner face substantially inward of said outer peripheral edge so as to maintain the peripheral edge free of lateral projections, and means engaged between said ears for selectively drawing said ears, and thereby the ring ends, toward each other for fixing a lens therein.

References Cited by the Examiner
UNITED STATES PATENTS 1,727,433   9/1929   King _____ 351—44

JORDAN FRANKLIN, *Primary Examiner.*

J. R. BOLER, *Assistant Examiner.*